(12) United States Patent
Macisaac et al.

(10) Patent No.: US 9,092,534 B2
(45) Date of Patent: Jul. 28, 2015

(54) SELF-MAINTAINING HYPERLINKS IN METHOD AUTHORING CONTENT

(75) Inventors: Bruce Macisaac, San Jose, CA (US); Jinhua Xi, Sunnyvale, CA (US); Kelvin B. Low, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 2614 days.

(21) Appl. No.: 11/564,737

(22) Filed: Nov. 29, 2006

(65) Prior Publication Data

US 2008/0126923 A1    May 29, 2008

(51) Int. Cl.
*G06F 17/30* (2006.01)
(52) U.S. Cl.
CPC .... *G06F 17/30882* (2013.01); *G06F 17/30896* (2013.01)
(58) Field of Classification Search
USPC ......................................................... 715/205
See application file for complete search history.

(56) References Cited

U.S. PATENT DOCUMENTS

| | | | |
|---|---|---|---|
| 7,555,707 B1 * | 6/2009 | Labarge et al. ............... | 715/234 |
| 7,562,287 B1 * | 7/2009 | Goldstein et al. ............. | 715/201 |
| 2002/0103824 A1 * | 8/2002 | Koppolu et al. ........... | 707/501.1 |
| 2004/0153465 A1 * | 8/2004 | Singleton et al. ............. | 707/100 |
| 2004/0205502 A1 * | 10/2004 | Baird ......................... | 715/501.1 |
| 2006/0161272 A1 * | 7/2006 | Haller et al. .................... | 700/29 |

* cited by examiner

*Primary Examiner* — Kavita Padmanabhan
*Assistant Examiner* — Tionna Burke
(74) *Attorney, Agent, or Firm* — Steven M. Greenberg, Esq.; CRGO Law

(57) ABSTRACT

Embodiments of the present invention address deficiencies of the art in respect to embedded hyperlinks in method content for a process modeler and provide a method, system and computer program product for self-maintaining hyperlinks in method content for a process modeler. In one embodiment of the invention, a self-maintaining hyperlink management method can be provided. The method can include parsing a method element in a process model to locate a self-maintaining hyperlink, locating a unique identifier in the self-maintaining hyperlink, retrieving data for external content associated with the unique identifier and replacing placeholder content in the self-maintaining hyperlink with the retrieved data. Thereafter, the process model can be published with the retrieved data in place of the placeholder content in the self-maintaining hyperlink.

14 Claims, 2 Drawing Sheets

SELF-MAINTAINING HYPERLINKS IN METHOD AUTHORING CONTENT

BACKGROUND OF THE INVENTION

1. Field of the Invention

The present invention relates to field of process visualization and management and more particularly to the model driven process visualization and management.

2. Description of the Related Art

A method architecture describes a schema for organizing large amounts of descriptions for development methods and processes, such as software engineering, mechanical engineering, business transformation, sales cycles and the like. A development method provides step-by-step explanations for a particular way of achieving a specific development goal under general circumstances such as transforming a requirements document into an analysis model, defining an architectural mechanism based on functional and non-functional requirements, creating a project plan for a development iteration, defining a quality assurance plan for functional requirements, or redesigning a business organization based on a new strategic direction.

A development process takes several of these methods and combines method steps into semi-ordered sequences creating a structure that is specific to temporal development circumstances such as how work is to be organized over time. The structure also can be specific to one type of development project, for instance the characteristics of the development project including development software for an online system versus software and hardware for an embedded system. A process is defined based on a lifecycle, which specifies how method elements such as tasks are being applied and work products are being produced over time by particular roles within the process.

Presently, there are several frameworks available in industry for the documentation of methods and the specification of processes. Commercial method and process management products include the Rational Unified Process Workbench™ manufactured by IBM Corporation of Armonk, N.Y., United States, now succeeded by the Rational Method Composer™. International standards for schemas for method and process management systems also exist. The most widely know standard of this field is the Software Process Engineering Meta-Model (SPEM) version 1.1 released by the Object Management Group (OMG).

Modern frameworks provide a user interface presenting a structured view of a process in terms of process content. Process content, at some level, generally includes method elements. In some cases, the method elements can refer to external content elements, such as guidelines, templates and roadmaps that are external to the referring method elements (but not the model itself). In this regard, references within the method elements can be linked to the external content elements by way of a hyperlink enabled according to the hypertext transfer protocol (HTTP). It will be recognized by the skilled artisan, however, that maintaining multiple hyperlinks for corresponding external content elements can be challenging—especially for larger process models. Moreover, method elements can change as can paths to the external content elements, in both cases disrupting the process model.

BRIEF SUMMARY OF THE INVENTION

Embodiments of the present invention address deficiencies of the art in respect to embedded hyperlinks in method content for a process modeler and provide a novel and non-obvious method, system and computer program product for self-maintaining hyperlinks in method content for a process modeler. In one embodiment of the invention, a self-maintaining hyperlink management method can be provided. The method can include parsing a method element in a process model to locate a self-maintaining hyperlink, locating a unique identifier in the self-maintaining hyperlink, retrieving data for external content associated with the unique identifier and replacing placeholder content in the self-maintaining hyperlink with the retrieved data. Thereafter, the process model can be published with the retrieved data in place of the placeholder content in the self-maintaining hyperlink.

In one aspect of the embodiment, parsing a method element in a process model to locate a self-maintaining hyperlink can include identifying a class reference within the hyperlink, determining whether the hyperlink is self-maintaining according to the class reference, and proceeding with locating the unique identifier only if the hyperlink is self-maintaining. In another aspect of the embodiment, retrieving data for external content associated with the unique identifier can include retrieving a name of the external content associated with the unique identifier. Alternatively, retrieving data for external content associated with the unique identifier can include retrieving a path to the external content associated with the unique identifier. As yet another alternative, retrieving data for external content associated with the unique identifier can include retrieving the type of content being referenced by the unique identifier.

In another embodiment of the invention, a process modeling data processing system can be provided. The system can include a process modeler configured to publish process models, and self-maintaining hyperlink management logic coupled to the process modeler. The logic can include program code enabled to parse method elements in the process models to locate different self-maintaining hyperlinks, to locate unique identifiers in each of the different self-maintaining hyperlinks, to retrieve different data for external content associated with each of the unique identifiers, and to replace placeholder content in each of the self-maintaining hyperlinks with the retrieved data. In one aspect of the embodiment, each of the self-maintaining hyperlinks can include an anchor tag encapsulating a class, a hyperlink, a unique identifier and a placeholder for data for external content associated with the unique identifier. The self-maintaining hyperlinks also can include instructions for what data to retrieve and display for the referenced external element.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for self-maintaining hyperlinks in method content for a process modeler. In accordance with an embodiment of the present invention, method content can be arranged in a process within a process modeler. At least one hyperlink to external content can be composed within the method content. Notably, for each hyperlink, a unique identifier can be embedded referencing corresponding external content along with a placeholder name. At publication time, the unique identifier can be retrieved and the contemporary name of the external content can replace the placeholder thereby ensuring the validity of the hyperlink in the method content.

Figure 1:
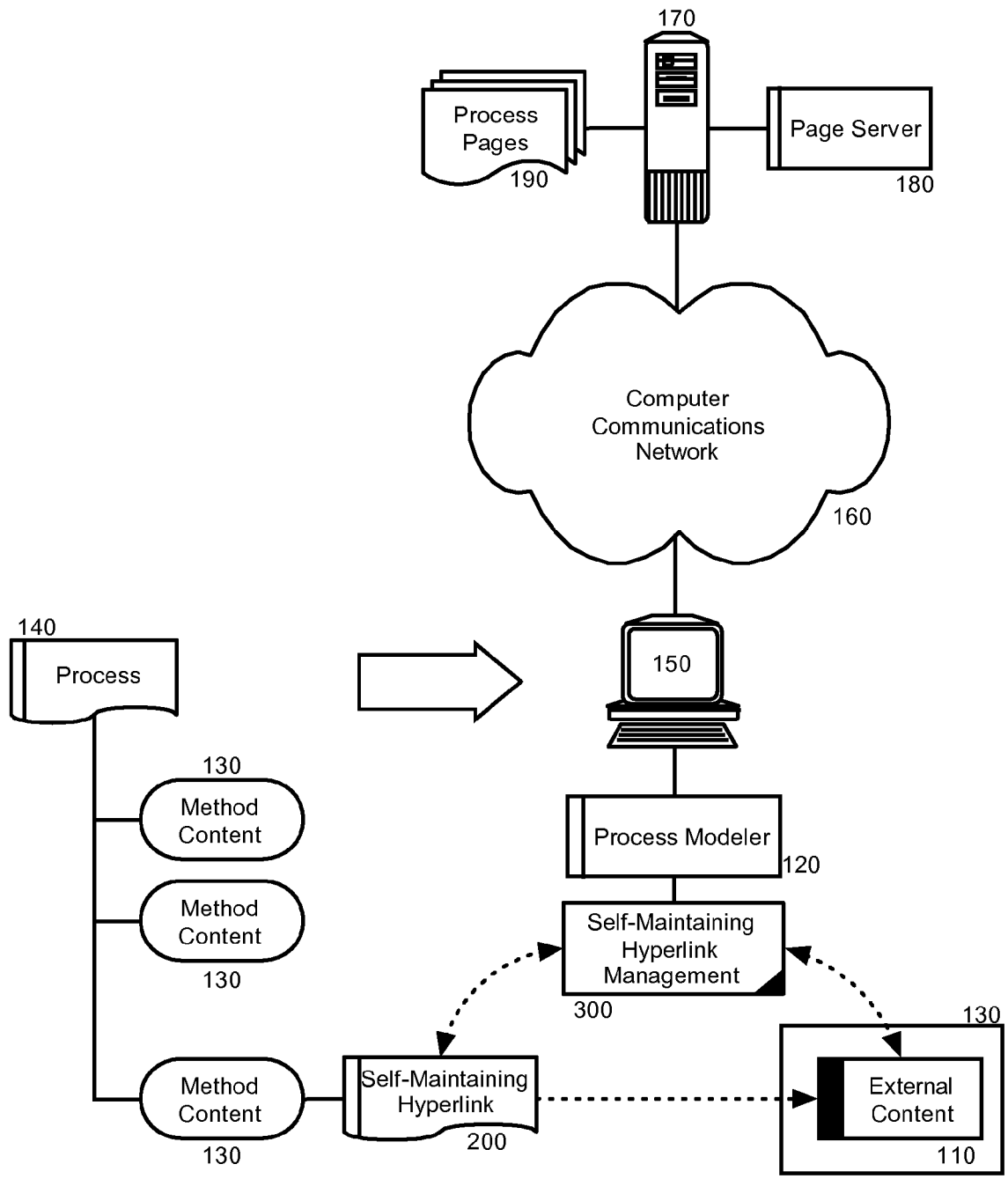
FIG. 1 is a schematic illustration of a process modeler data processing system configured for self-maintaining hyperlinks in method content.

In further illustration, FIG. 1 is a schematic illustration of a process modeler data processing system configured for self-maintaining hyperlinks in method content. The system can include a host computing platform 150 supporting the execution of a process modeler 120. The host computing platform 150 can be coupled to a server computing platform 170 over a computer communications network 160. The server computing platform 170 can include a page server 180 configured to serve process pages 190 to requesting clients (not shown) over the computer communications network 160. The process pages 190 can include external content 110 utilized in process model 140.

The process modeler 120 can include a configuration for modeling a process into process model 140. The process model 140 can include an arrangement of method content 130 describing tasks, resources and roles associated with driving a process to completion. The method content 130 can include, in at least one instance, a self-maintaining hyperlink 200. The self-maintaining hyperlink 200 can refer to external content 110 by reference to a unique identifier associated with the external content 110. The self-maintaining hyperlink 200 further can include placeholder content for the external content 110.

Notably, self-maintaining hyperlink management logic 300 can be coupled to the process modeler 120. The self-maintaining hyperlink management logic 300 can include program code enabled to recognize the self-maintaining hyperlink 200 and to locate the external content 110 associated with the unique identifier of the self-maintaining hyperlink 200. The program code of the self-maintaining hyperlink management logic 300 further can be enabled to replace the placeholder content with the external content 100 when publishing the process model 140 to the page server 180. In this way, as the external content 110 changes, the self-maintaining hyperlink 200 can remain valid despite changes to the external content 110.

Figure 2:
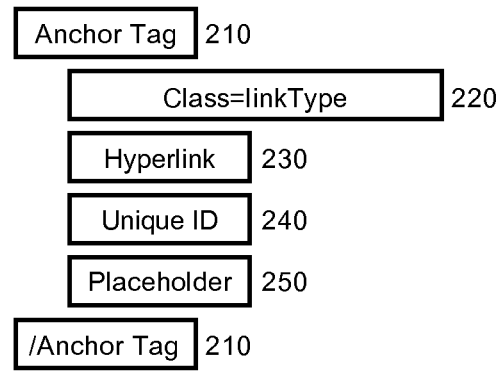
FIG. 2 is a block diagram of a self-maintaining hyperlink in method content for a process modeler; and, FIG. 3 is a flow chart illustrating a process for managing self-maintaining hyperlinks in method content for a process modeler.

In further illustration, FIG. 2 is a block diagram of a self-maintaining hyperlink in method content for a process modeler. The self-maintaining hyperlink can include an anchor tag 210 encapsulating each of a class tag 220, a hyperlink to external content 230, a unique identifier 240 for the external content, and placeholder content 250. The class tag 220 can specify for the benefit of self-maintaining hyperlink management logic whether or not to process the hyperlink 230 expressly utilizing the placeholder content 250, or as self-maintaining in association with the unique identifier 240. In the latter circumstance, the unique identifier 240 can be associated with external content such that during publication of a process model, the placeholder content 250 can be replaced with the external content retrieved in association with the unique identifier.

Figure 3:
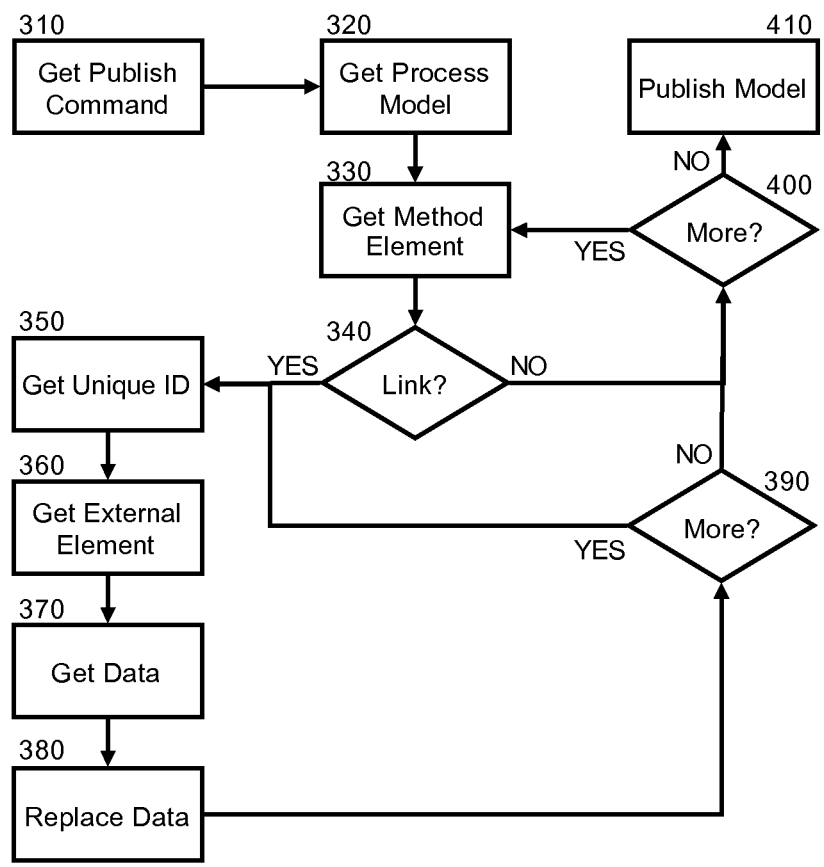

In yet further illustration, FIG. 3 is a flow chart illustrating a process for managing self-maintaining hyperlinks in method content for a process modeler. Beginning in block 310, a publish command can be received to publish a referenced process model including arranged method content. In block 320, the referenced process model can be retrieved and in block 330, a first method element arranged in the process model can be retrieved. In decision block 340, it can be determined whether the retrieved method element includes a hyperlink. If not, the process can continue through decision block 390 for remaining method elements in the process model. Otherwise, the process can proceed through block 350.

In block 350, a unique identifier can identified in the hyperlink. Thereafter, in block 360, external content associated with the unique identifier can be located within a table of identifiers. In block 370, data for the external content can be retrieved. For example, the data can be a name of a page or network distributable resource, a path to a page or network distributable resource, the identity of a user or role, or the name or location of an electronic document, to name only a few. Finally, in block 380, the placeholder data in the hyperlink can be replaced with the retrieved data and, in decision block 390, if additional hyperlinks remain to be processed in the method element, the process can return to block 350. Otherwise, in decision block 400 if additional method elements remain in the process model, the process can repeat through block 330. Otherwise, the process model can be published in block 410.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device).

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A self-maintaining hyperlink management method comprising:
    parsing in a process modeler executing in memory by at least one processor of a host computing platform, a method element in a process model to locate a self-maintaining hyperlink, the parsing comprising identifying a class reference within the hyperlink and determining whether the hyperlink is self-maintaining according to the class reference;
    locating a unique identifier in the self-maintaining hyperlink only if it is determined that the hyperlink is self-maintaining;
    retrieving data for external content associated with the unique identifier;
    replacing placeholder content in the self-maintaining hyperlink with the retrieved data; and,
    publishing the process model with the retrieved data in place of the placeholder content in the self-maintaining hyperlink.

2. The method of claim 1, wherein retrieving data for external content associated with the unique identifier, comprises retrieving a name of the external content associated with the unique identifier.

3. The method of claim 1, wherein retrieving data for external content associated with the unique identifier, comprises retrieving a path to the external content associated with the unique identifier.

4. The method of claim 1, wherein retrieving data for external content associated with the unique identifier, comprises retrieving a name of a type of content associated with the unique identifier.

5. A process modeling data processing system comprising:
    a host computing platform with at least one processor and memory;
    a process modeler executing in the memory by the at least one processor and configured to publish process models; and,
    self-maintaining hyperlink management logic coupled to the process modeler, the logic comprising program code enabled to parse method elements in the process models to locate different self-maintaining hyperlinks, the parsing comprising identifying class reference within the hyperlink and determining whether of the hyperlinks is self-maintaining according to the class reference, to locate unique identifiers in each of the different self-maintaining hyperlinks only if it is determined that a corresponding one of the hyperlinks is self-maintaining, to retrieve different data for external content associated with each of the unique identifiers, and to replace placeholder content in each of the self-maintaining hyperlinks with the retrieved data.

6. The system of claim 5, wherein the each of the self-maintaining hyperlinks comprises an anchor tag encapsulating a class, a hyperlink, a unique identifier and a placeholder for data for external content associated with the unique identifier.

7. The system of claim 5, wherein the data for external content comprises a name for the external content.

8. The system of claim 5, wherein the data for external content comprises a path to the external content.

9. The system of claim 5, wherein the data for external content comprises a type of external content.

10. The system of claim 5, wherein the external content is a markup language specified page.

11. A computer program product comprising a computer usable storage medium storing computer usable program code for self-maintaining hyperlink management, the computer program product comprising:
    computer usable program code for parsing a method element in a process model to locate a self-maintaining hyperlink, the parsing comprising identifying class reference within the hyperlink and determining whether the hyperlink is self-maintaining according to the class reference;
    computer usable program code for locating a unique identifier in the self-maintaining hyperlink only if it is determined that the hyperlink is self-maintaining;
    computer usable program code for retrieving data for external content associated with the unique identifier;
    computer usable program code for replacing placeholder content in the self-maintaining hyperlink with the retrieved data; and,
    computer usable program code for publishing the process model with the retrieved data in place of the placeholder content in the self-maintaining hyperlink.

12. The computer program product of claim 11, wherein the computer usable program code for retrieving data for external content associated with the unique identifier, comprises computer usable program code for retrieving a name of the external content associated with the unique identifier.

13. The computer program product of claim 11, wherein the computer usable program code for retrieving data for external content associated with the unique identifier, comprises computer usable program code for retrieving a path to the external content associated with the unique identifier.

14. The computer program product of claim 11, wherein the computer usable program code for retrieving data for external content associated with the unique identifier, comprises computer usable program code for retrieving a type of content associated with the unique identifier.

* * * * *